US012589360B2

(12) United States Patent
Bagge et al.

(10) Patent No.: US 12,589,360 B2
(45) Date of Patent: Mar. 31, 2026

(54) HYDROPHILIC MEMBRANE SEPARATION LAYER

(71) Applicant: NITTO DENKO CORPORATION, Ibaraki (JP)

(72) Inventors: Bita Bagge, Loveland, OH (US); Robb Bagge, Loveland, OH (US); Shijun Zheng, San Diego, CA (US); Weiping Lin, Carlsbad, CA (US); Peng Wang, San Diego, CA (US)

(73) Assignee: NITTO DENKO CORPORATION, Ibaraki (JP)

( * ) Notice: Subject to any disclaimer, the term of this patent is extended or adjusted under 35 U.S.C. 154(b) by 405 days.

(21) Appl. No.: 18/285,016

(22) PCT Filed: Mar. 29, 2022

(86) PCT No.: PCT/US2022/022319
§ 371 (c)(1),
(2) Date: Sep. 29, 2023

(87) PCT Pub. No.: WO2022/212357
PCT Pub. Date: Oct. 6, 2022

(65) Prior Publication Data
US 2024/0173676 A1 May 30, 2024

Related U.S. Application Data

(60) Provisional application No. 63/168,478, filed on Mar. 31, 2021.

(51) Int. Cl.
*B01D 63/08* (2006.01)
*B01D 69/02* (2006.01)
(Continued)

(52) U.S. Cl.
CPC ........... *B01D 63/087* (2013.01); *B01D 69/02* (2013.01); *B01D 69/1213* (2022.08);
(Continued)

(58) Field of Classification Search
CPC .. B01D 63/087; B01D 69/02; B01D 69/1213; B01D 71/54; B01D 71/56; B01D 71/68;
(Continued)

(56) References Cited

U.S. PATENT DOCUMENTS

2012/0067812 A1* 3/2012 Muratani ............... B01D 71/54
210/490

FOREIGN PATENT DOCUMENTS

CN        102489174 A        6/2012
CN        107875867 A        4/2018
(Continued)

OTHER PUBLICATIONS

International Search Report issued on Jul. 14, 2022, for corresponding International Patent Application No. PCT/US2022/022319 (3 pages).
(Continued)

*Primary Examiner* — Ekandra S. Miller-Cruz
(74) *Attorney, Agent, or Firm* — Hauptman Ham, LLP

(57) ABSTRACT

Described herein are gas separation membranes that provide improved compatibility between the gutter layer and the porous support and/or the separation layer for gases. Such composite membranes have a high water/air selectivity in permeability.

12 Claims, 1 Drawing Sheet

(51) Int. Cl.

| | | |
|---|---|---|
| B01D 69/12 | (2006.01) | |
| B01D 71/54 | (2006.01) | |
| B01D 71/56 | (2006.01) | |
| B01D 71/68 | (2006.01) | |

(52) U.S. Cl.
CPC ............. B01D 71/54 (2013.01); B01D 71/56 (2013.01); B01D 71/68 (2013.01); B01D 2323/226 (2022.08)

(58) Field of Classification Search
CPC .......... B01D 2323/226; B01D 2256/10; B01D 2257/504; B01D 69/12; B01D 71/52; B01D 71/06; B01D 53/22; Y02C 20/40
USPC ........................................................ 210/650
See application file for complete search history.

(56) References Cited

FOREIGN PATENT DOCUMENTS

| | | |
|---|---|---|
| EP | 0 174 918 A1 | 3/1986 |
| JP | S61-54222 A | 3/1986 |
| JP | 2015-160159 A | 9/2015 |
| JP | 2015-160160 A | 9/2015 |
| JP | 2017-136546 A | 8/2017 |

OTHER PUBLICATIONS

Written Opinion issued on Jul. 14, 2022, for corresponding International Patent Application No. PCT/US2022/022319 (10 pages).

Dai et al., "Pebax /TSIL blend thin film composite membranes for CO2 separation," Science China Chemistry; The Frontiers of Chemical Biology and Synthesis, Mar. 15, 2016, vol. 59, no. 5, pp. 538-546; Cited in NPL Nos. 1 and 2.

Chen et al., "High performance composite hollow fiber membranes for CO2/H2 and CO2/N2 separation," International Journal of Hydrogen Energy, Feb. 22, 2014, vol. 39, no. 10, pp. 5043-5053; Cited in NPL Nos. 1 and 2.

Huang et al., "Pebax/ionic liquid modified graphene oxide mixed matrix membranes for enhanced CO2 capture," Journal of Membrane Science, Aug. 23, 2018, vol. 565, pp. 370-379; Cited in NPL Nos. 1 and 2.

Jomekian et al., "Experimental and modeling study of CO2 separation by modified Pebax 1657 TFC membranes," Korean Journal of Chemical Engineering, Oct. 27, 2020, vol. 37, No. 11, pp. 2020-2040; Cited in NPL Nos. 1 and 2.

Notice of Reasons for Refusal issued on Jan. 6, 2026 for corresponding Japanese Patent Application No. 2023-558685, along with an English machine translation (13 pages).

* cited by examiner

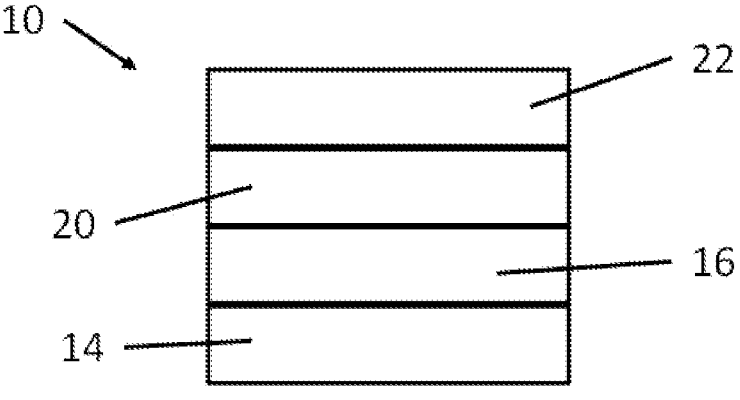

HYDROPHILIC MEMBRANE SEPARATION LAYER

CROSS-REFERENCE TO RELATED APPLICATIONS

This application is a National Stage of International Application No. PCT/US2022/022319, filed on Mar. 29, 2022, which is based upon and claims priority to the U.S. Provisional Patent Application No. 63/168,478, filed on Mar. 31, 2021. All of the aforementioned applications are hereby incorporated by reference in their entireties.

BACKGROUND

Unless otherwise indicated in the present disclosure, the details described in the present disclosure are not prior art to the claims in the present application and are not admitted to be prior art by inclusion in this section.

A gas separation membrane can be formed with a porous support layer and an active (e.g., gas discriminating, or gas selective, or gas separation) layer and is used for selectively separating gases from a gas mixture using pore size and structural properties of the gas separation layer. Accordingly, gas permeability and selectivity are used as important indicators regarding the performance of the membrane, and such performance is largely affected by the materials forming the active layer.

A common component of such gas separation membranes is an intermediate layer or "gutter layer." A gutter layer is a gas permeable polymeric layer, usually used to provide a smooth gas permeable intermediate surface between the support layer and the gas separation layer. Most gutter layers are hydrophobic in nature, generally comprising polyalkyl-siloxanes or polyalkoxysiloxanes, e.g., polydimethylsi-loxane (PDMS). PDMS is a hydrophobic material and may have binding difficulties with the materials that are usually used as the support material and/or the gas separation layer, which detracts from the bonding of these respective layers, leading to premature delamination of the membrane. Responsive to this problem, some have treated such surfaces with high energy plasma and/or functionalizing the surface with hydrophilic functional groups. However, these solutions require an extra surface activation step in order to work effectively, which may increase production costs of membranes prepared using siloxane gutter layers.

Thus, there is a need for a means to improve the compatibility of the intermediate gutter layer with the support layer and the gas separation layer.

SUMMARY

The present disclosure includes a gas separation membrane comprising: a porous substrate; an intermediate gutter layer, wherein the gutter layer comprises a hydrophilic polymer and a crosslinker; and a gas separation layer comprising at least one ionic liquid and a polymer.

In some embodiments, the porous substrate comprises polysulfone. In some embodiments, the hydrophilic polymer of the intermediate gutter layer comprises polyurethane.

In some embodiments, the crosslinker of the intermediate gutter layer comprises a polyfunctional aziridine liquid crosslinker.

In some embodiments, the gas separation membrane gutter layer comprises about 97 wt % polyurethane and about 3 wt % polyfunctional aziridine liquid crosslinker. In some embodiments, the gas separation membrane gutter layer is essentially silicon free. In some embodiments the ionic liquid of the gas separation layer comprises 1-butyl-3-methylimidazolium tetrafluoroborate, 1-ethyl-3-methyl-imidazoliumtetrafluoroborate, 1-ethyl-3-methylimidazolium bis(trifluoromethylsulfonyl)imide, 1-ethyl-3-methylimida-zolium acetate, or any combination thereof. In some embodiments, the polymer of the gas separation layer comprises a polyether block amide, polyethylene glycol, or a combination thereof. In some embodiments, the ionic liquid and the polymer of the gas separation layer are present in a relative amount of about 92.2 to about 7.8.

In some embodiments, the gas separation membrane further comprises a protective layer. In some embodiments, the protective layer comprises polyurethane, polyether block amide, or a combination thereof.

BRIEF DESCRIPTION OF THE DRAWING

FIG. 1 is a depiction of a possible embodiment of a selective dehydration membrane.

DETAILED DESCRIPTION

General

The present disclosure is related to selectively permeable gas separation membranes, including membranes comprising a gutter layer positioned between a porous support and a gas separation layer.

A selectively permeable membrane includes a membrane that is relatively permeable to one gas and relatively impermeable to another gas. For example, a membrane may be relatively permeable to carbon dioxide and relatively impermeable to nitrogen and/or hydrogen. The ratio of permeability for different materials may be useful in describing their selective permeability, e.g., their selectivity.

Some embodiments include a gas separation membrane, such as membrane 10 (see FIG. 1). The membrane may comprise a porous support, such as porous support 14; an intermediate gutter layer, such as layer 16, wherein the gutter layer comprises a hydrophilic polymer and a cross-linker and is disposed upon the support; and a gas separation layer, such as layer 20, wherein the gas separation layer is a gas discriminating layer and is disposed upon the gutter layer. In some embodiments, the gas separation membrane may comprise a protective layer, such as layer 22, wherein the protective layer is disposed externally to or on top of the gas separation layer. In some embodiments, the hydrophilic polymer of the gutter layer may comprise polyurethane.

Porous Support

A porous support may be any suitable material and in any suitable form upon which a layer, such as a layer of the selectively permeable membrane, may be deposited or disposed. In some embodiments, the porous support may comprise hollow fibers or porous material. In some embodiments, the porous support may comprise a porous material, such as a polymer or a hollow fiber. Some porous supports may comprise a non-woven fabric. In some embodiments, the polymer may be polyamide (Nylon), polyimide (PI), polyvinylidene fluoride (PVDF), polyethylene (PE), polypropylene (including stretched polypropylene), polyethylene terephthalate (PET), polysulfone (PSF), polyether sulfone (PES), cellulose acetate, polyacrylonitrile (e.g., PA200), or a combination thereof. In some embodiments, the porous support may comprise an amorphous polymer. In some embodiments, the porous support may have a glass transition temperature above 150° C., 175° C., or 180° C. (e.g., polysulfones can have a glass transition temperature between 190° C. and 230° C.). In some embodiments, the porous support may have a continuous service temperature of greater than 140° C., e.g., polysulfone (PSF) with about 150° C. A suitable means for determining continuous service temperature can be the method described in Underwriters Laboratory (UL) 746. In some embodiments, the porous support comprises PSF.

Intermediate Layer ("Gutter Layer")

In some embodiments, the gas separation membrane comprises an intermediate layer disposed between the porous support and the gas separation layer.

For the purposes of this disclosure, the intermediate layer may be termed an intermediate gutter layer or a gutter layer. In some embodiments, the gutter layer may comprise a hydrophilic polymer. It is believed that the gutter layer may be used to smooth the surface of the support layer and prevent the penetration of the gas separation layer composition into the support layer. In some embodiments, the hydrophilic polymer of the gutter layer may be poly(vinylpyrrolidone), or any copolymers composed of monomeric units containing vinyl-pyrrolidone groups. Other examples of suitable gutter layer hydrophilic polymers include, but are not limited to, poly(acrylic acid), poly(methacrylic acid), poly(2-ethylacrylic acid), poly(2-propylacrylic acid), poly(sulfopropyl acrylate) potassium salt, poly(2-hydroxypropyl methacrylate), poly(2-methacryloyloxyethyl phosphorylchlorine), or any copolymers comprising of one or more of these groups. In some embodiments, the hydrophilic polymer of the gutter layer may be poly(vinyl alcohol), poly(ethylene glycol), or poly(ethylene oxide). In other embodiments, the hydrophilic polymer of the gutter layer may be poly(2-oxazoline) and polyethylenimine, poly(N-isopropylacrylamide), or polyacrylamide. In certain embodiments, the hydrophilic polymer of the gutter layer may be a polyelectrolyte, such as poly(diallyldimethylammonium chloride), poly(vinylphosphonic acid), poly(vinyl sulfate) potassium salt, poly(vinylsulfonic acid, sodium salt), poly(styrenesulfonate), poly(allylamine hydrochloride), or any other similar water-soluble polyelectrolyte. In other embodiments, the hydrophilic polymer of the gutter layer may be a polysaccharide, such as a starch, a glycogen, an arabinoxylan, a chitin, an alginate, a pectin, hyaluronic acid, an acidic polysaccharide, or any other water soluble natural or synthetic polysaccharide.

Other examples of hydrophilic polymers for use in the gutter layer include hydroxylated silicon oxide, polyethylene glycol, poloxamine, polysorbate, polypropylene glycol, polyurethane, isocyanate, polyethylene oxide, and other similar compounds and combinations thereof.

Combinations of the above hydrophilic polymers for use in the gutter layer are also envisioned.

In other embodiments, the hydrophilic polymers of the gutter layer range in molecular weight from 1 k to 2000k, for example, from 2k to 1000k, from 3k to 700k, from 5k to 500k, from 7k to 400k, or from 10k to 300k.

In some embodiments, the hydrophilic polymer of the gutter layer may comprise a material that has a static water contact angle $\theta$ that is <90°. In some embodiments the material may have a static water contact angle of $\theta$ that is <70°, 75°, 80°, 85°, and or 90°. In some embodiments, the hydrophilic polymer of the gutter layer can be thermoplastic. In some embodiments, the thermoplastic hydrophilic polymer comprises polyurethanes, polyether-amides block copolymers, polyethylene-acrylic acid copolymers, polyethylene oxide copolymers, ethylene acrylic esters copolymers, polylactide and copolymers, polyamides, polyester block copolymers, sulfonated polyesters, poly-ether-ester block copolymers, poly-ether-ester-amide block copolymers, polyacrylates, polyacrylic acids and derivatives, ionomers, polyethylene-vinyl acetate with a vinyl acetate, polyvinyl alcohol and its copolymers, polyvinyl ethers and their copolymers, poly-2-ethyl-oxazoline and derivatives, polyvinyl pyrrolidone and its copolymers, thermoplastic cellulose derivatives, or any combination thereof. In some embodiments, the gutter layer can comprise at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or at least 99 wt % of the hydrophilic polymer. In some embodiments, the hydrophilic polymer of the gutter layer may be a polyurethane comprising urethane monomers. In some embodiments, the polyurethane may be an aliphatic polyurethane. In some embodiments, the polymer may comprise polyester or polyether polyols and diol or diamine chain extenders.

In some embodiments, the gutter layer may comprise a hydrophilic polymer and a crosslinker. Any suitable crosslinker may be employed. In some embodiments, the crosslinker is a polyfunctional aziridine liquid crosslinker. In some embodiments, the gutter layer comprises a hydrophilic polyurethane polymer and a polyfunctional aziridine liquid crosslinker.

In some embodiments, the relative amounts of components of the gutter layer by weight percentage are about 97 wt % polyurethane to about 3 wt % crosslinker.

In some embodiments, the gutter layer can comprise less than 0.5 wt %, less than 1.0 wt %, less than 2.5 wt %, less than 5.0 wt %, or less than 7.5 wt % silicon and/or siloxane. In some embodiments, the gutter layer can be essentially silicon free, e.g., the gutter layer contains essentially no silicon.

Gas Separation Layer

The gas separation membrane of the present disclosure comprises a gas separation layer. In some embodiments, the gas separation layer comprises an ionic liquid and a polymer.

In some embodiments, the gas separation layer comprises an ionic liquid. In some embodiments, the ionic liquid may comprise an imidazolium-based ionic liquid. In some embodiments, the imidazolium-based ionic liquid can be 1-butyl-3-methylimidazolium-tetrafluoroborate, 1-ethyl-3-methylimidazolium tetrafluoroborate, 1-ethyl-3-methylimidazolium bis(trifluoromethylsulfonyl)imide ([$C_2$mim] [$NTf_2$], 1-ethyl-3-methylimidazolium acetate ([$C_2$mim] [OAc]), or a combination thereof.

In some embodiments, the gas separation layer comprises a polymer. In some embodiments, the polymer may comprise a hydrophilic polymer. In some embodiments, the hydrophilic polymer may be a polyether block amide (PE-BAX, e.g., PEBAX 1657 (Akema)), polyethylene glycol (PEG), or a combination thereof. In some embodiments, the relative amounts of ionic liquid to polymer in the gas separation layer may be from about 70% to about 99% of ionic liquid to about 1% to about 30% of hydrophilic polymer. In some embodiments, the amount of ionic liquid may be about 70-75%, about 75-80%, about 80-85%, about 85-90%, about 90-95%, about 95-99%, about 92.2%, or any percentage in a range bounded by any of these values. In some embodiments, the amount of hydrophilic polymer may be about 1-5%, about 5-10%, about 10-15%, about 15-20%, about 20-25%, about 25-30%, about 7.8%, or any percentage in a range bounded by any of these values. In one embodiment, the gas separation layer has a relative amount of 92.2% ionic liquid and 7.8% polymer PEBAX 1657.

Protective Layer

In some embodiments, the gas separation membrane may comprise a protective layer. In some embodiments, the protective layer is disposed upon the gas separation layer, distal from the porous substrate. In some embodiments, the protective layer may comprise curable compositions which comprise the same as other gas separation membrane elements of the gas separation membrane. This can lead to efficiencies in manufacturing and raw material costs. In some embodiments, the amount of each component used to make the protective layer is within at most 10%, more preferably within about 5%, of the amount of the same component used to make the gutter layer. For example, if the gutter layer comprises 90 wt % of a particular component (e.g., polyurethane), then the protective layer may comprise 81 wt % to 99 wt % (i.e., +/−10%), 85.0 wt % to 95.0 wt % (i.e., +/−5%), of that same component.

In another embodiment, the protective layer may comprise a polyamine and the gas separation layer may comprise carboxylic acid groups. It is believed that the attraction between the amine groups in the polyamine protective layer and the carboxylic acid groups of the gas separation layer may enhance the adhesion of the protective layer to the gas separation layer.

EMBODIMENTS

The following embodiments are specifically contemplated.

Embodiment 1. A gas separation membrane comprising:
a. a porous substrate;
b. a gutter layer, wherein the gutter layer comprises a hydrophilic polymer; and
c. a selective layer, wherein the selective layer comprises at least one ionic liquid, and a polymer.

Embodiment 2. The gas separation membrane of embodiment 1, wherein the gutter layer is essentially silicon free.

Embodiment 3. The gas separation membrane of embodiment 1, wherein the hydrophilic polymer comprises polyurethane (PU) and cross-linker.

Embodiment 4. The gas separation membrane of embodiment 1, wherein the at least one ionic liquid comprises 1-butyl-3-methylimidazolium-tetrafluoroborate, 1-ethyl-3-methylimidazolium-tetrafluoroborate, 1-ethyl-3-methylimidazolium bis(trifluoromethylsulfonyl)imide ([$C_2$mim] [$NTf_2$], and 1-ethyl-3-methylimidazolium acetate ([$C_2$mim] [OAc]).

Embodiment 5. The gas separation membrane of embodiment 1, wherein the second polymer comprises a polyether block amide or polyethylene glycol.

Embodiment 6. The gas separation membrane of embodiment 1, further comprising a protective layer.

EXAMPLES

It has been discovered that embodiments of the selectively permeable membranes described herein have improved performance as compared to other selectively permeable membranes. These benefits are further demonstrated by the following examples, which are intended to be illustrative of the disclosure only, but are not intended to limit the scope or underlying principles in any way.

Example 1: Preparing the Membrane Elements

A 4"×4" inch polysulfone (PSF) substrate was soaked in distilled deionized water for 1 hour prior usage to fill the pore size with water and reduce the coating material penetration inside the pores during coating.

Preparation of PEBAX: 6 g of Pebax pallet (Arkema Americas, King of Prussia, PA, USA) was mixed with 194 g of 7 water/3 ethanol weight ratio mixture to make 3 wt % solution and the mixture was stirred in water bath at 80° C. for 3.5 hours and was cooled down to room temperature. The Pebax and ionic liquid, e.g., one selected from imidazolium-based ionic liquids like 1-butyl-3-methylimidazolium tetrafluoroborate ([BMIM][BF4]), 1-ethyl-3-methylimidazolium tetrafluoroborate ([EMIM][BF4]), 1-ethyl-3-methylimidazolium bis(trifluoromethylsulfonyl)imide ([$C_2$mim][$NTf_2$], or 1-ethyl-3-methylimidazolium acetate ([$C_2$mim][OAc], were mixed at a ratio of Pebax to ionic liquid of 7.8:92.2, sonicating the mixture for 1 h in RT water bath followed by stirring for half an hour and repeating this sonicating and stirring steps three (3) times. The Pebax/ionic liquid solution was spin coated (using spin coater from Laurell Technologies Corp. Model: WS-400B-6NPP/LITE/AS/C2) by using 1.5 ml of solution dropping onto the PSF substrate coated with hydrophilic gutter layer (from Example 2 below) via a casting method on a spin coater as follows: 10(s) for 1000 rpm, then 40(s) at 2000 rpm, and then 3(s) at 800 rpm.

Example 2: Assembling Membrane with Hydrophilic Gutter Layer 3.88 g polyurethane (PU) (NeoRez® R-967, DSM Coating Resins, Augusta, GA, USA) and 0.12 g CX-100 (polyfunctional aziridine liquid cross-linker, DSM Coating Resins, Augusta, GA, USA) to provide a weight ratio of 100 PU:3 CX-100 dissolved in water (196.0 g) to make a 2 wt % solution (about 200 ml).

A 4"×4" mm polysulfone (PSF) substrate was soaked in distilled deionized water for 1 hour prior to usage in order to fill the substrate's pores with water and prevent any of the coating material from penetrating inside the pores during coating. 50 ml of the 2 wt % polyurethane (PU)-Cx-100 solution in deionized water prepared as described in Example 1 above, was placed on top of the PSF substrate with the calculated thickness of around 2 μm via casting method and dried on the vacuum system at 4 torr at RT for 10 minutes followed by drying overnight. The resulting coated substrate was dried at 80° C. for 1 hour in a vacuum oven (TVO-5 Vacuum oven, Cascade TEK, Irving, TX, USA).

Example 3: Measurement of Contact Angle

A contact angle measuring system (Attension® Theta Lite optical tensiometer, Biolin Scientific UK, Manchester, United Kingdom) was used to measure the static water contact angle of membranes. A deionized water droplet was placed on a dry flat membrane surface and the contact angle was obtained. The reported contact angle value was calculated by averaging over more than three to four contact angle values at different sites. Other suitable methods for determining contact angle include ASTM D5725-99 (2008) and TAPPI Standard T552. Addition of 2 wt % PU-CX-100 on the PSF substrate provided a contact angle of 70°, compared to 92° for PSF alone without the gutter layer. The results indicate that the PU-CX-100 gas separation membrane surface was more hydrophilic than membranes without the gutter layer, enabling the hydrophilic ionic liquid/polymer gas separation layer to uniformly coat the surface. $CO_2$ gas permeance of the 2 wt % PU-CX-100 PSF substrate membrane was about 2600 GPU, and the $CO_2/N_2$ gas permeance selectivity was 5.5.

Example 4: Performance of the Membrane Elements

The membrane elements prepared in Example 1 were tested for gas permeance and gas selectivity performance. As shown in Table 1 below, all 4 membranes having the PU-CX-100 gutter layer showed good performance. For membranes having a silicon gutter layer, 3 of 4 membranes had poor performance due to the poor quality of the films comprising a silicon gutter layer because of its hydrophobic nature.

TABLE 1

| Ionic liquid (IL) | Pebax + IL on silicon | | | Pebax + IL on PU-CX-100 | | |
|---|---|---|---|---|---|---|
| | Film-forming | $CO_2/N_2$ | $CO_2$ GPU | Film-forming | $CO_2/N_2$ | $CO_2$ GPU |
| [BMIM][BF$_4$] | ✓ | 68 | 97 | ✓ | 65 | 101 |
| [C$_2$mim][NTf$_2$] | x | — | — | ✓ | 70 | 260 |
| [EMIM][BF$_4$] | x | — | — | ✓ | 60 | 112 |
| [C$_2$mim][OAc] | x | — | — | ✓ | 70 | 184 |

Unless otherwise indicated, all numbers expressing quantities of ingredients, properties such as molecular weight, reaction conditions, and etc. used in herein are to be understood as being modified in all instances by the term "about." Each numerical parameter should at least be construed in light of the number of reported significant digits and by applying ordinary rounding techniques. Accordingly, unless indicated to the contrary, the numerical parameters may be modified according to the desired properties sought to be achieved, and should, therefore, be considered as part of the disclosure. At the very least, the examples shown herein are for illustration only, not as an attempt to limit the scope of the disclosure.

The terms "a," "an," "the" and similar referents used in the context of describing embodiments of the present disclosure (especially in the context of the following embodiments) are to be construed to cover both the singular and the plural, unless otherwise indicated herein or clearly contradicted by context. All methods described herein may be performed in any suitable order unless otherwise indicated herein or otherwise clearly contradicted by context. The use of any and all examples, or representative language (e.g., "such as") provided herein is intended merely to better illustrate embodiments of the present disclosure and does not pose a limitation on the scope of any embodiment. No language in the specification should be construed as indicating any non-embodied element essential to the practice of the embodiments of the present disclosure.

Groupings of alternative elements or embodiments disclosed herein are not to be construed as limitations. Each group member may be referred to and embodied individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the embodiments. Of course, variations on these described embodiments will become apparent to those of ordinary skill in the art upon reading the foregoing description. The inventor expects skilled artisans to employ such variations as appropriate, and the inventors intend for the embodiments of the present disclosure to be practiced otherwise than specifically described herein. Accordingly, the embodiments include all modifications and equivalents of the subject matter recited in the embodiments as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the embodiments. Other modifications that may be employed are within the scope of the embodiments. Thus, by way of example, but not of limitation, alternative embodiments may be utilized in accordance with the teachings herein. Accordingly, the embodiments are not limited to embodiments precisely as shown and described.

What is claimed is:

1. A gas separation membrane comprising: a porous substrate; an intermediate gutter layer, wherein the intermediate gutter layer comprises a hydrophilic polymer and a crosslinker; a gas separation layer, wherein the gas separation layer comprises at least one ionic liquid and a polymer; and wherein the intermediate gutter layer is positioned between the porous substrate and the gas separation layer; wherein the hydrophilic polymer of the intermediate gutter layer comprises polyurethane.

2. The gas separation membrane of claim 1, wherein the porous substrate comprises polysulfone.

3. The gas separation membrane of claim 1, wherein the crosslinker of the intermediate gutter layer comprises a polyfunctional aziridine liquid crosslinker.

4. The gas separation membrane of claim 1, wherein the intermediate gutter layer comprises about 97 wt % of the polyurethane and about 3 wt % polyfunctional aziridine liquid crosslinker.

5. The gas separation membrane of claim 1, wherein the intermediate gutter layer is essentially silicon free.

6. The gas separation membrane of claim 1, wherein the ionic liquid of the gas separation layer comprises 1-butyl-3-methylimidazolium tetrafluoroborate, 1-ethyl-3-methylimidazoliumtetrafluoroborate, 1-ethyl-3-methylimidazolium bis(trifluoromethylsulfonyl)imide, 1-ethyl-3-methylimidazolium acetate, or any combination thereof.

7. The gas separation membrane of claim 1, wherein the polymer of the gas separation layer comprises a polyether block amide, polyethylene glycol, or a combination thereof.

8. The gas separation membrane of claim 1, wherein the ionic liquid and the polymer of the gas separation layer are present in a relative amount of about 92.2 to about 7.8.

9. The gas separation membrane of claim 1, further comprising a protective layer.

10. The gas separation membrane of claim 9, wherein the protective layer comprises a polyurethane, a polyether block amide, or a combination thereof.

11. A gas separation membrane comprising:
a porous substrate;
an intermediate gutter layer, wherein the intermediate gutter layer comprises a hydrophilic polymer and a crosslinker;
a gas separation layer, wherein the gas separation layer comprises at least one ionic liquid and a polymer;
wherein the intermediate gutter layer is positioned between the porous substrate and the gas separation layer; and wherein the crosslinker of the intermediate gutter layer comprises a polyfunctional aziridine liquid crosslinker.

12. A gas separation membrane comprising:

a porous substrate;

an intermediate gutter layer, wherein the intermediate gutter layer comprises a hydrophilic polymer and a crosslinker;

a gas separation layer, wherein the gas separation layer comprises at least one ionic liquid and a polymer;

wherein the intermediate gutter layer is positioned between the porous substrate and the gas separation layer; and wherein the intermediate gutter layer comprises about 97 wt % polyurethane and about 3 wt % polyfunctional aziridine liquid crosslinker.

\* \* \* \* \*